United States Patent [19]
Jordan

[11] 3,856,262
[45] Dec. 24, 1974

[54] VALVE

[76] Inventor: Chalmer C. Jordan, Perry Hwy., Saegertown, Pa. 16433

[22] Filed: Nov. 17, 1972

[21] Appl. No.: 307,657

[52] U.S. Cl. .............................. 251/340, 251/149.4
[51] Int. Cl. ............................................. F16k 51/00
[58] Field of Search ........... 251/340, 341, 347, 349, 251/149.4, DIG. 1

[56] References Cited
UNITED STATES PATENTS

| | | | |
|---|---|---|---|
| 1,036,446 | 8/1912 | Burt | 251/340 |
| 1,706,072 | 3/1929 | Rieqer | 251/347 X |
| 2,325,325 | 7/1943 | Kiene | 251/340 |
| 2,574,851 | 11/1951 | Wagner | 251/DIG. 1 |
| 2,612,337 | 9/1952 | Maynard | 251/340 |
| 2,688,975 | 9/1954 | Born | 251/DIG. 1 |
| 2,713,989 | 7/1955 | Bryant | 251/DIG. 1 |
| 2,870,780 | 1/1959 | Fladung | 251/340 X |
| 2,931,668 | 4/1960 | Baley | 251/149.4 X |
| 3,093,155 | 6/1963 | Dawes | 251/340 X |
| 3,123,337 | 3/1964 | Peras | 251/340 X |
| 3,285,270 | 11/1966 | Klinefelter | 251/347 X |
| 3,321,178 | 5/1967 | Pinke et al | 251/347 |
| 3,367,626 | 2/1968 | Stern | 251/340 |
| 3,431,028 | 3/1969 | Yoder | 137/513.5 X |
| 3,527,441 | 9/1970 | Fisher | 251/347 |
| 3,559,952 | 2/1971 | Skinner | 251/347 |
| 3,605,808 | 9/1971 | Fisher | 251/340 X |
| 3,706,318 | 12/1972 | Baniadam et al. | 251/149.4 X |
| 3,712,583 | 1/1973 | Martindale et al. | 251/149.4 |

FOREIGN PATENTS OR APPLICATIONS

| | | | |
|---|---|---|---|
| 493,089 | 4/1919 | France | 251/347 |

*Primary Examiner*—Henry T. Klinksiek

[57] ABSTRACT

A valve made up of a body and a sleeve telescopically received in the body. A hand wheel is concentrically received on the sleeve and threadably received on the body for moving the sleeve axially of the body. A seal is provided in the body between the body and the sleeve. The seal closes the flow passage between the body and the sleeve when the sleeve is moved to one extreme position and opens the flow passage when the sleeve is moved to another extreme position. The sleeve is non-circular so that it will not rotate relative to the body. The valve is suitable for use on hot water tanks and the like for closing off the flow of water.

9 Claims, 3 Drawing Figures

VALVE

OBJECTS OF THE INVENTION

It is an object of the invention to provide an improved valve.

Another object of the invention is to provide a valve that is simple in construction, economical to manufacture, and simple and efficient to use.

Another object of the invention is to provide an improved combination seal and sleeve arrangement.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
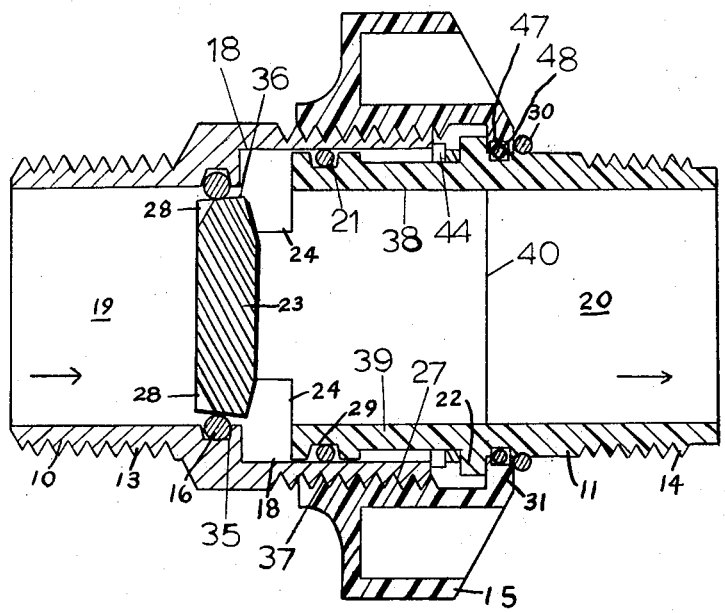
FIG. 1 is a longitudinal cross sectional view taken on line 1—1 of FIG. 2.
Figure 2:
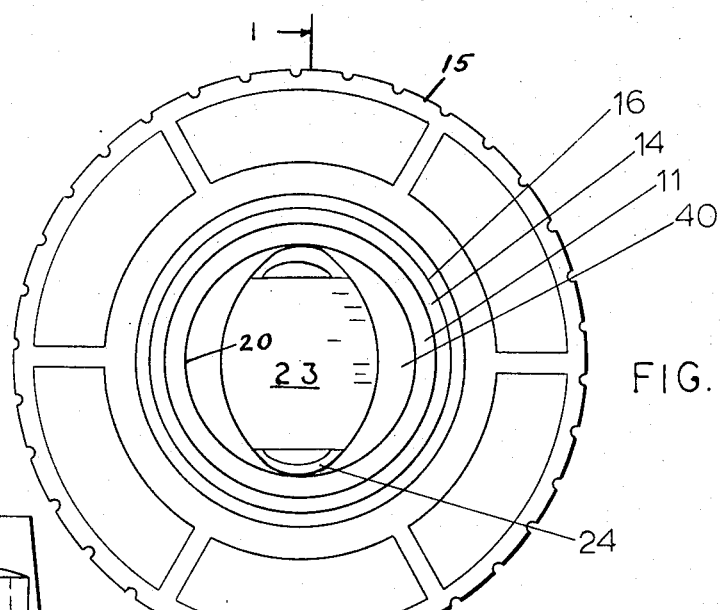
FIG. 2 is a view taken from the left hand end of the valve.
Figure 3:
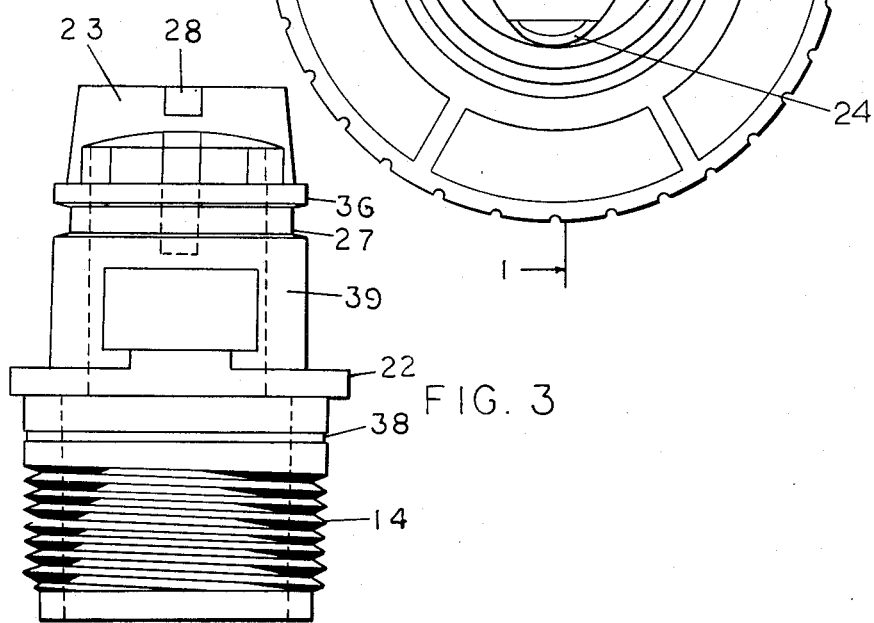
FIG. 3 is a side view of the sleeve shown in FIG. 1.

Now with more particular reference to the drawings, FIG. 1 shows a valve in closed position having a body 10 and a sleeve 11. The body 10 has a hollow inlet end 19 and the sleeve 11 has a hollow cylindrical outlet end 20 providing a flow passage. Apertures 24 are provided in the end of the sleeve adjacent the body end and the hollow is closed by the end partition 23. Thus when the sleeve 11 is moved to the left, the outer periphery of the partition 23 moves out of engagement with the O-ring 16 and liquid can flow through the inlet 19 and through the apertures 24 to the outlet 20.

The body 10 has external threads 13 which may be connected to a water heater or the like and external threads 27 which mate with the internal threads on the handwheel 15. An internal groove 35 is formed in the body 10 which receives an O-ring 16 as shown. The O-ring 16 makes sliding contact with the outside round cylindrical periphery 36 of the end partition 23 of the sleeve 11. The end partition 23 of the sleeve 11 has diametrically opposed notches 28 formed in it through which water can pass and relieve pressure on the O-ring 16 thereby preventing the O-ring from rolling out of groove 35, as the sleeve 11 is moved to closed position.

The internal oval shaped counterbore 18 is formed in the body 10. O-ring 21 is received in groove 29. O-ring 21 makes sliding contact with the internal surface of oval shaped counterbore 18.

The handwheel 15 has internal threads 37 which engage the external threads 27 on the body 10. The sleeve 11 has a smooth internal ovaloid cylindrical passage. The part of the body 10 starting at 40 is an ovaloid cylindrical passage extending to end partition 23. The laterally disposed apertures 24 allow water to flow outward and around the end partition 23 when the sleeve 11 is moved to the right to the open position. The O-ring 21 is received in external groove 29 in the sleeve 11 and the retainer ring 47 is received in the groove 48 in the outer periphery of the sleeve 11. Snap ring 30 rests against the flange 31 and rotatably holds handwheel 15 to sleeve 11.

The part 39 of the sleeve 11 between the flange 22 and closed end 23 is ovaloid in cross section, that is, it is oval shaped in cross section. The oval shaped part 39 of the sleeve is received in an internally oval bore 18 in the body 10 so that the sleeve 11 cannot rotate relative to the body.

When the handwheel 15 is rotated in a left hand direction opening apertures 24, the body 10 and sleeve 11 are restrained against relative rotation by the oval shaped parts that mate, as the handwheel 15 is unscrewed from the threads 27 and the flange 31 pushes against the ring 30 and pushes the sleeve 11 axially away from the body 10.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a body, a sleeve telescopically received in said body,
said sleeve having a partition supported on one end, an external flange on said sleeve,
a nut threadably received on said body and receiving said sleeve,
a flange on said nut engaging said flange on said sleeve for moving said sleeve toward and away from said body,
a sealing means in said body adapted to engage said partition on said sleeve whereby a flow passage through said valve is stopped when said sleeve is in a first position,
said sleeve being movable to a second position whereby said partition is out of engagement with said sealing means whereby a flow passage is established through said valve,
said sleeve having a oval shaped portion received in a complementary shaped portion in said body whereby said body and said sleeve are held against relative rotation.

2. The valve recited in claim 1 wherein an external groove is provided on said sleeve,
a snap ring in said groove,
and said flange on said hand wheel is disposed between said flange on said sleeve and between said snap ring whereby said sleeve is moved by said handwheel.

3. The valve recited in claim 1 wherein said oval shaped portion has a peripheral groove therein,
and an O-ring is supported on the external periphery of said sleeve,
said O-ring engaging the inner periphery of said complementary portion of said body providing a seal between said sleeve and said body.

4. The valve recited in claim 1 wherein said sealing means comprises an O-ring disposed in an internal groove in said body slidably engaging said partition member.

5. A valve comprising a hollow body adapted to be connected to a source of liquid,
   said hollow body having an oval shaped portion therein,
   and a sleeve having an oval shaped portion slidably received in said body oval shaped portion whereby said sleeve is restrained against rotation,
   an internal groove in said body,
   an O-ring in said groove,
   said sleeve having a portion slidably engaging said O-ring when said sleeve is in a first position providing a seal against the flow of liquid,
   said sleeve being adapted to be moved to a second position at which position said O-ring is out of engagement with said sleeve whereby a flow path is provided through said valve.

6. The valve recited in claim 5 wherein said oval shaped portion of said sleeve has an external groove,
   a second O-ring in said external groove in said oval shaped portion,
   said second O-ring making sliding engagement with said body.

7. The valve recited in claim 5 wherein said sleeve has a closed end against said first O-ring and laterally disposed notches adjacent said closed end communicating with the inside of said sleeve,
   said first O-ring engaging said sleeve upstream of said notches when said sleeve is in a first position,
   said sleeve being adapted to move to a second position out of engagement with said first mentioned O-ring providing a flow passage through said sleeve.

8. The valve recited in claim 7 wherein said sleeve upstream of said notches is cylindrical shaped.

9. The valve recited in claim 8 wherein two radially disposed notches are formed in the upstream end of said sleeve and provide a flow to prevent said O-ring from rolling out of its groove.

* * * * *